United States Patent
Yukihiro et al.

(10) Patent No.: US 7,948,847 B2
(45) Date of Patent: May 24, 2011

(54) APPARATUS AND METHOD TO WRITE/REPRODUCE DATA TO/FROM OPTICAL DISC

(75) Inventors: Yamasaki Yukihiro, Suwon-si (KR); Kagimoto Tomohiro, Suwon-si (KR); Tasaka Shuichi, Suwon-si (KR); Ji Seon Baek, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 537 days.

(21) Appl. No.: 12/029,523

(22) Filed: Feb. 12, 2008

(65) Prior Publication Data

US 2008/0212425 A1    Sep. 4, 2008

(30) Foreign Application Priority Data

Feb. 15, 2007    (KR) .................. 10-2007-0016019

(51) Int. Cl.
G11B 7/00    (2006.01)
(52) U.S. Cl. ............... 369/53.27; 369/53.34; 369/53.28
(58) Field of Classification Search ............... 369/53.34, 369/44.32
See application file for complete search history.

(56) References Cited

U.S. PATENT DOCUMENTS

| 6,510,116 | B1 * | 1/2003 | Miyagawa et al. | 369/59.12 |
|---|---|---|---|---|
| 2002/0031060 | A1 * | 3/2002 | Mashimo et al. | 369/44.29 |
| 2002/0122359 | A1 | 9/2002 | Yoshida | |
| 2004/0076092 | A1 * | 4/2004 | Seo et al. | 369/44.29 |
| 2004/0145978 | A1 * | 7/2004 | Yamamoto | 369/44.32 |
| 2005/0270941 | A1 | 12/2005 | Nakajo | |
| 2006/0007828 | A1 * | 1/2006 | Kadowaki et al. | 369/53.12 |
| 2006/0044991 | A1 * | 3/2006 | Nishihara et al. | 369/272.1 |
| 2006/0140097 | A1 * | 6/2006 | Tasaka et al. | 369/59.11 |
| 2006/0233075 | A1 | 10/2006 | Yeh | |
| 2006/0239166 | A1 * | 10/2006 | Yu | 369/59.11 |
| 2008/0013417 | A1 * | 1/2008 | Jung | 369/44.27 |

FOREIGN PATENT DOCUMENTS

| CN | 1855249 | 11/2006 |
|---|---|---|
| CN | 1855281 | 11/2006 |
| JP | 2000-251254 | 9/2000 |

(Continued)

OTHER PUBLICATIONS

European Office Action issued Dec. 29, 2008 in Europe Application No. 08101564.6.

(Continued)

*Primary Examiner* — Adam R Giesy
(74) *Attorney, Agent, or Firm* — Stanzione & Kim, LLP

(57) ABSTRACT

An apparatus and method to write/reproduce data to/from an optical disc, which are capable of preventing an error from occurring at the time of examination of a writing strategy and searching for an optimum writing condition for a short period of time, by examining the writing strategy after adjusting a focus in a test region, in order to set a writing condition at the time of writing data. The apparatus to write/reproduce data to/from an optical disc includes a matrix jitter measuring unit which measures length errors and jitters of edges of a mark and a space of a written data pattern from an RF signal generated at the time of reproduction of the optical disc; and a CPU which extracts at least one of the RF signal, a jitter and an error rate, controls a focus bias, and performs an optimum power calibration (OPC) for searching for optimum power of laser.

14 Claims, 9 Drawing Sheets

FOREIGN PATENT DOCUMENTS

| | | |
|---|---|---|
| JP | 2002-025066 | 1/2002 |
| JP | 2002-092880 | 3/2002 |
| JP | 2002-319161 | 10/2002 |
| JP | 2003-30837 | 1/2003 |
| JP | 2003030837 | 1/2003 |
| JP | 2005-050394 | 2/2005 |

OTHER PUBLICATIONS

Japanese Office Action and Notice of Reason for Rejection dated Aug. 27, 2009 issued in JP Application No. 2008-033614.

Chinese Office Action issued Jun. 12, 2010 in CN Application No. 200810096392.0.

* cited by examiner

3mns-nm 3s Tld,Ltr Adjust

| Tld | 3m | 4m | 5m | >6m |
|-----|----|----|----|-----|
| 3s  | // | // | // | //  |
| 4s  | // |    |    |     |
| 5s  | // |    |    |     |
| >6s | // |    |    |     |

| Ltr | 3s | 4s | 5s | >6s |
|-----|----|----|----|-----|
| 3m  | // | // | // | //  |
| 4m  | // |    |    |     |
| 5m  | // |    |    |     |
| >6m | // |    |    |     |

Tld Adjust

| Tld | 3m | 4m | 5m | >6m |
|-----|----|----|----|-----|
| 3s  |    |    |    |     |
| 4s  |    | // | // | //  |
| 5s  |    | // | // | //  |
| >6s |    | // | // | //  |

☐ Fixed parameter
▨ Adjust parameter

Ltr Adjust

| Ltr | 3s | 4s | 5s | >6s |
|-----|----|----|----|-----|
| 3m  |    |    |    |     |
| 4m  |    | // | // | //  |
| 5m  |    | // | // | //  |
| >6m |    | // | // | //  |

APPARATUS AND METHOD TO WRITE/REPRODUCE DATA TO/FROM OPTICAL DISC

CROSS-REFERENCE TO RELATED APPLICATIONS

This application claims the benefit of Korean Patent Application No. 2007-16019, filed on Feb. 15, 2007 in the Korean Intellectual Property Office, the disclosure of which is incorporated herein by reference in its entirety.

BACKGROUND OF THE INVENTION

1. Field of the Invention

The present general inventive concept relates to an apparatus and method of writing/reproducing data to/from an optical disc, and, more particularly, to an apparatus and method of writing/reproducing data to/from an optical disc, which are capable of preventing an error from occurring at the time of examination of a writing strategy and searching for an optimum writing condition in a short period of time, by examining the writing strategy after adjusting a focus in a test region, in order to set a writing condition at the time of writing data.

2. Description of the Related Art

Generally, optical discs have a variety of formats and various speeds. Despite of the same format and speed, the characteristics of the disc vary according to disc makers. In order to stably write/reproduce data to/from various discs, the following method is performed.

First, a method of recognizing a disc maker or the like from disc information and writing/reproducing data to/from a disc under a writing condition prepared in firmware which is previously stored in a CPU is performed. Second, in an unknown disc which is previously stored in a writing condition table, a method of searching for a writing condition by examination of a writing strategy and writing/reproducing data to/from a disc is performed.

The conventional method of operation of an apparatus to write/reproduce data to/from an optical disc will be described below while referring to FIG. 1.

First, MID information, which is information on a disc maker, is recognized from disc information (operation S1). Next, if the recognized MID information is identical to MID information registered in the CPU (operation S2), a write pulse is generated by a writing strategy which is previously registered (operation S3), optimum power is searched for by an optimum power calibration (OPC) (operation S13), and then data is written to the disc (operation S14).

However, if the disc information (MID information) is not identical to the disc information which is previously prepared, it is determined that write pulse information of the disc is not present (operation S4), and an optimum writing strategy is searched for. Here, a method of searching for the optimum writing strategy is described below.

First, if it is determined that the write pulse information of the disc is not present (operation S4), a write pulse is generated by a general writing strategy of the disc (operation S5), and a pre-OPC is performed in order to examine the writing strategy (operation S6).

Here, the OPC searches for power having a predetermined value due to an unbalance degree, a modulation degree, and an error rate, in a reproduction signal of a writing portion having variable power.

Thereafter, a writing strategy is variably written with optimum power searched by the pre-OPC (operation S7) and a writing strategy having a minimum average jitter obtained from the reproduction signal is searched for (operation S9). Here, variable searching of a 3Ttop pulse is performed. If the writing strategy is variable, a target unbalance degree varies. Accordingly, whenever the writing strategy varies (operation S7), the pre-OPC should be performed (operation S8).

Finally, a byte error rate (BER) obtained by performing a writing/reproducing operation by the writing strategy having the minimum average jitter is checked (operation S10) and it is determined whether the writing is possible by the searched result. If the writing is possible (operation S11), a focus is adjusted (operation S12), the OPC is performed (operation S13), and the writing operation is performed (operation S14).

If the power exceeds a predetermined reference value by the pre-OPC, the occurrence of a writing error, the checking of the BER and the measurement of the jitter, if an error occurs, or if an algorithm is not normally finished, the writing operation cannot be performed due to a writing condition searching error of the disc.

However, since the adjustment of the focus of an unknown disc is performed in the jitter at the time of the writing/reproducing operation using the writing strategy after searching for the writing strategy, the writing strategy searching error occurs due to dependency on an initial focus position, and thus the writing operation cannot be performed with respect to the disc.

If the pre-OPC of the unknown disc is performed using the general writing strategy, the pre-OPC result is set to high power, which exceeds an upper limit of laser power, and thus the writing operation cannot be performed with respect to the disc.

Since the measurement of the jitter is restricted to the average jitter, only a portion (3Ttop or the like) of the write pulse which can be observed by a jitter measuring device can be searched for. Accordingly, since the searching of the writing strategy is restricted, the BER is not normally checked due to deterioration in writing characteristics (jitter loss), and thus the writing operation cannot be performed with respect to the disc.

SUMMARY OF THE INVENTION

The present general inventive concept provides an apparatus and method of writing/reproducing data to/from an optical disc, which are capable of preventing an error from occurring at the time of searching for a writing strategy due to dependency on an initial focus position by adjusting a focus before searching for the writing strategy, and improving write/reproduction capability and enhancing countermeasure capability of a disc by searching for an optimum writing condition in a short period of time.

The present general inventive concept also provides an apparatus and method of writing/reproducing data to/from an optical disc, which are capable of reducing the number of consumed sectors at the time of examination of a writing strategy after adjusting a focus.

The present general inventive concept also provides an apparatus and method of writing/reproducing data to/from an optical disc, which are capable of ensuring a power output margin at the time of an optimum power calibration in consideration of an output limit of a laser diode.

Additional aspects and/or advantages of the present general inventive concept will be set forth in part in the description which follows and, in part, will be obvious from the description, or may be learned by practice of the general inventive concept.

The foregoing and/or other aspects and utilities of the present general inventive concept are achieved by providing an apparatus to write/reproduce data to/from an optical disc, the apparatus including: a matrix jitter measuring unit which measures length errors and jitters of edges of a mark and a space of a written data pattern from an RF signal generated at the time of reproduction of the optical disc; and a CPU which extracts at least one of the RF signal, a jitter and an error rate, controls a focus bias, and performs an optimum power calibration (OPC) for searching for optimum power of a laser.

The foregoing and/or other aspects and utilities of the present general inventive concept may also be achieved by providing a method of setting a writing condition of an optical disc, the method including: searching for a writing strategy after adjusting a focus of the optical disc; performing a pre-optimum power calibration (pre-OPC) and controlling the searching of the writing strategy; and checking a byte error rate (BER) and writing data to a data writing region.

Since an OPC is performed after adjusting a focus at the time of searching for a writing condition, an error can be prevented from occurring due to initial focus dependency at the time of searching for a writing strategy. Accordingly, the writing strategy can be searched for in a stable state. In addition, since an optimum writing condition can be searched for in a short period of time, the write/reproduction capability of a disc can be improved and countermeasure capability of a disc can be enhanced.

It is possible to ensure a power output margin at the time of the OPC in consideration of an output limit of a laser diode.

The foregoing and/or other aspects and utilities of the present general inventive concept may also be achieved by providing a method of setting a laser writing condition of an optical disc, the method including processing a reproduction signal reflected from the optical disc; measuring a length error of a rising edge and a length error of a falling edge of a space and a mark of each written data pattern on the disc from the processed reproduction signal; measuring a jitter of the rising edge and a jitter of the falling edge of the space and the mark of each written data pattern on the disc; and adjusting a focus bias of the laser based on the measured results.

The adjusting the focus bias can be performed where the error rate is at a minimum value, the RF signal becomes a maximum value and the jitter becomes a minimum value.

The adjusting the focus bias can be performed by a central value of a laser power margin The method may further include searching for a writing strategy after adjusting the focus bias of the optical disc; performing a pre-optimum power calibration (pre-OPC) and controlling the searching of the writing strategy; and checking a byte error rate (BER) and writing data to a data writing region.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 7A to 7C are views illustrating parameters to control the method of examining the writing strategy according to the embodiment of FIG. 5;

DETAILED DESCRIPTION OF THE PREFERRED EMBODIMENTS

Figure 1:
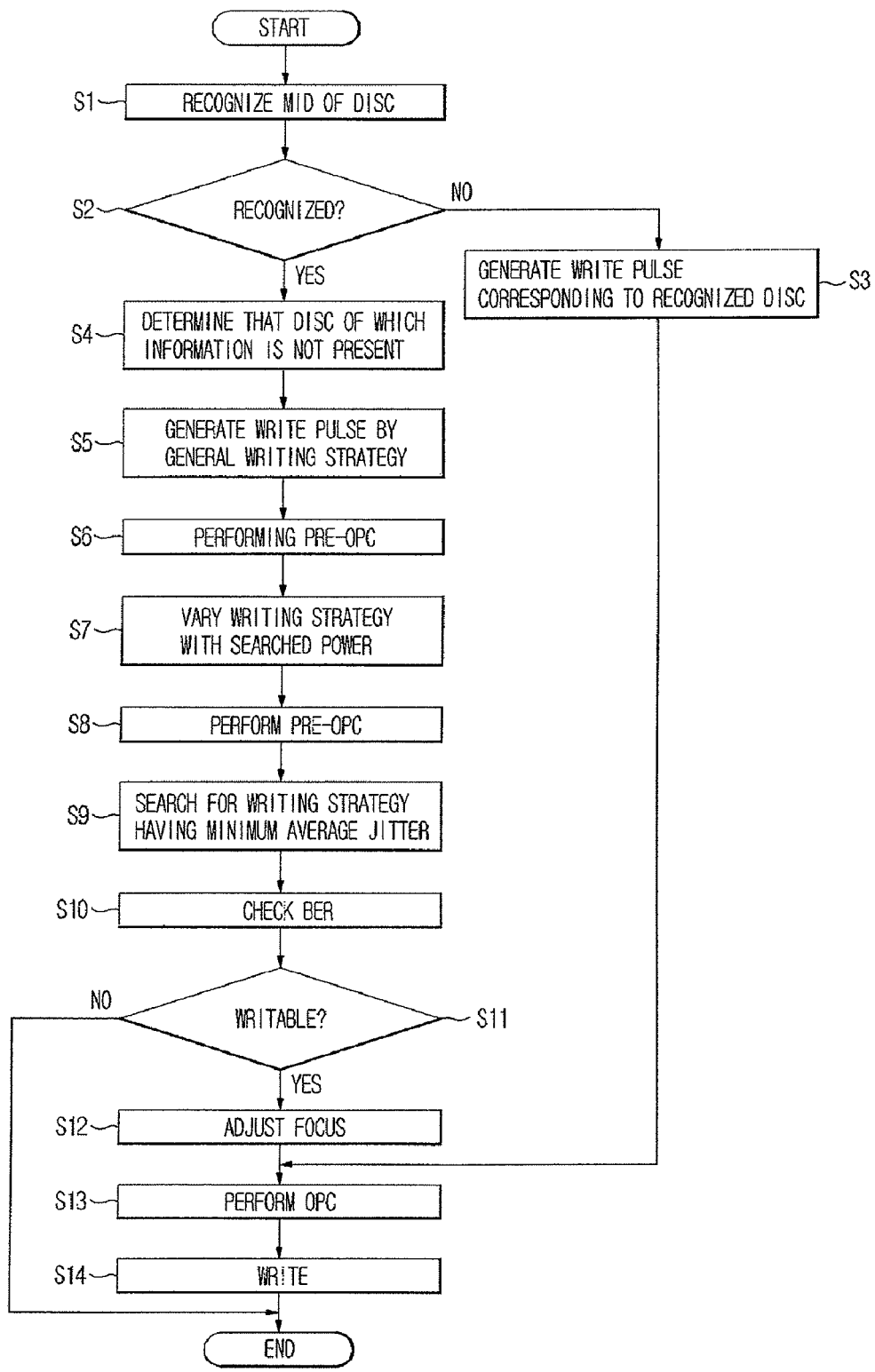
FIG. 1 is a flowchart illustrating a conventional method for writing/reproducing information.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Hereinafter, embodiments of the present general inventive concept will be described in detail with reference to the accompanying drawings.

Figure 2:
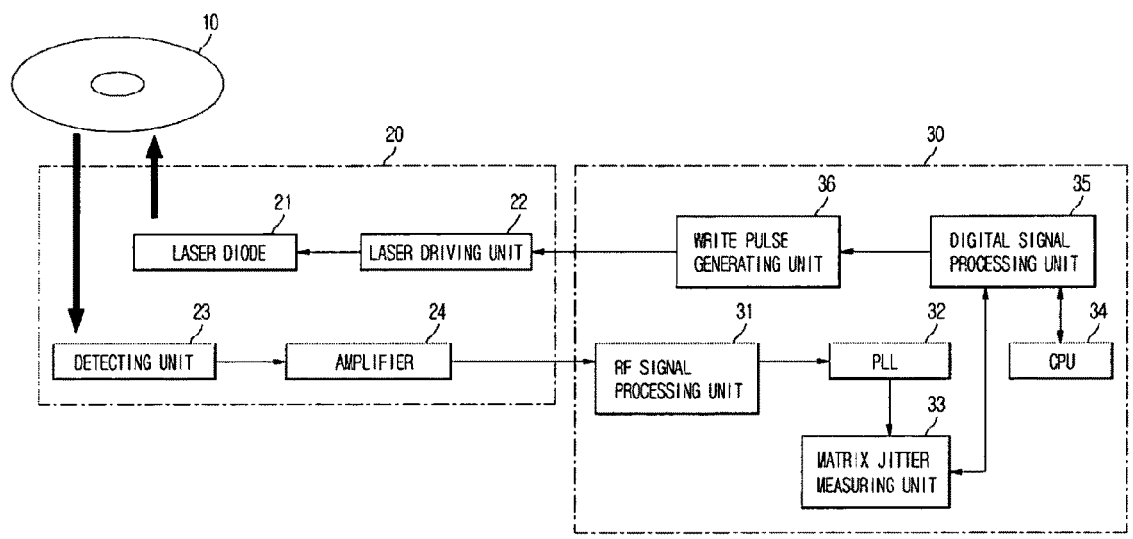
FIG. 2 is a view illustrating a configuration of an apparatus to write/reproduce information according to an embodiment of the present general inventive concept.

FIG. 2 is a view illustrating the configuration of an apparatus to write/reproduce information according to an embodiment of the present general inventive concept, which includes an optical disc 10, an optical pickup 20 and an optical driver 30.

The optical disc 10 is rotated and driven by a motor. The motor rotates the optical disc by a driving signal generated by a CPU.

Here, the optical disc may be any one of a CD-R, a CD-RW, a DVD-R, a DVD±RW, a DVD-RAM, a HD DVD-RW, a HD DVD-R, a blue-ray disc (BD)-RE and a BD-R. In such optical discs, data can be written at least once. Among them, in the R type, data can be written once. In the RW, RE and RAM types, data can be rewritten at least two times (about several thousands to hundreds of thousands of times).

Among them, a DVD±R/Dual/RW/RAM, BD and a HD-DVD are preferably used and discs having various speeds of ×1/×4/×8/×16 may be used.

The optical pickup 20 includes a laser diode 21 and a laser driving unit 22 to drive the laser diode 21 according to a driver pulse signal (Elantec). The laser diode 21 irradiates a laser beam having a power corresponding to a writing power onto a writing surface of the optical disc 10 such that data transmitted from an external system is written to the optical disc 10 according to a channel clock signal (CHCLK). The laser diode 21 also irradiates the laser beam having power corresponding to a reproduction power onto the optical disc 10 such that data written to the optical disc 10 is reproduced (read).

When the data written to the optical disc 10 is reproduced, the laser beam irradiated onto the data writing surface of the optical disc 10 is reflected from the data writing surface of the optical disc 10, and the reflected light is detected by a detecting unit 23, is amplified by an amplifier 24, and is transmitted to an RF signal processing unit 31 of the optical driver 30.

The optical pickup 20 is moved to a test region of the optical disc 10 for an optimum power calibration (OPC) in order to examine a recording condition of the optical disc 10. At this time, the laser beam of the laser diode 21 is irradiated onto the optical disc 10 and the light reflected from the optical disc 10 is input to the RF signal processing unit 31 through a photodiode.

The optical driver 30 includes the RF processing unit 31 to process a reproduction signal reflected from the optical disc 10, to generate an RF signal, and to convert the RF signal into a binary signal, a phase lock loop (PLL) 32 to uniformly maintain the frequency of an output signal output from the RF signal processing unit 31, a matrix jitter measuring unit 33 to measure a jitter from a PLL error signal obtained by the PLL 32, a CPU 34 to store a plurality of pieces of firmware, to search firmware corresponding to the optical disc, and to control a write pulse according to the searched firmware, and a write pulse generating unit 36 to generate a write pulse under the control of the CPU.

Here, the matrix jitter measuring unit 33 measures a length error of a rising edge and a length error of a falling edge of a space and a mark of each written data pattern from the signal transmitted from the PLL 32 to control the RF reproduction signal reflected from the disc, measures a jitter of the rising edge and a jitter of the falling edge of the space and the mark of each written data pattern, and transmits measured data to the CPU 34 through the digital signal processing unit 35. A variation in writing characteristics of the write pulses such as Ttop, Tmp, Tld and Tip represented by the structure of the writing strategy illustrated in FIG. 6 can be measured.

Figure 4A:
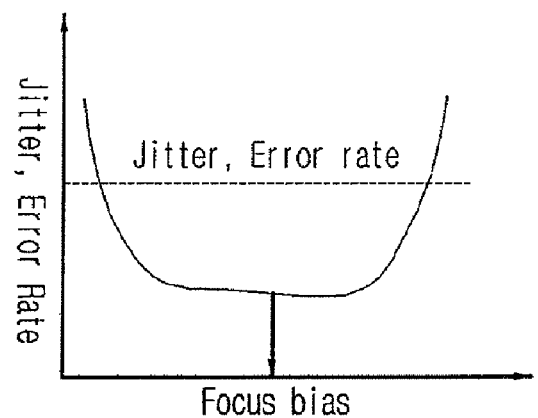
FIGS. 4A and 4B are views illustrating a method of adjusting a focus bias according to an embodiment of the present general inventive concept.

The CPU 34 adjusts a focus bias in order to optimize a focus position of an objective lens relative to the optical disc, receives data measured by the matrix jitter measuring unit 33, detects an error rate of the reproduction data at the time of reproduction of the optical disc, as illustrated in FIG. 4A, measures a point where the error rate becomes a minimum value and the amount of jitter from the reproduction data, and adjusts the focus bias at the point where the error rate becomes a minimum value.

Figure 4B:
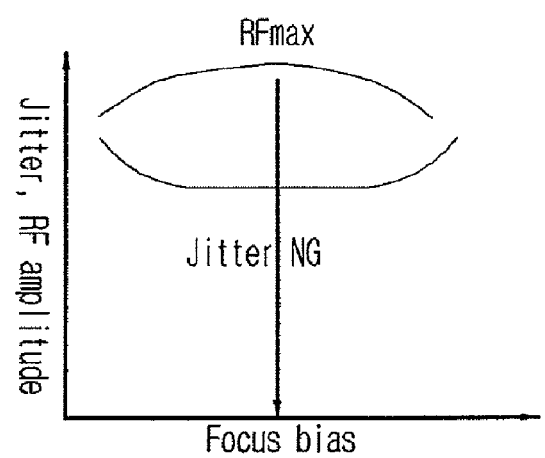

The CPU 34 adjusts the focus bias at the point where the RF signal becomes a maximum value and the jitter becomes a minimum value or adjusts the focus bias by a central value of a laser power margin, as illustrated in FIG. 4B.

Accordingly, the CPU 34 adjusts the focus bias such that a proper focus driving voltage is applied to the objective lens of the optical pickup 20.

The CPU 34 adjusts the focus bias at the time of writing data to the optical disc, performs the OPC to search for the laser output characteristics corresponding to an optical output signal due to the characteristics of the laser diode, and performs the examination of the writing strategy to search for an optimum writing strategy.

Figure 6:
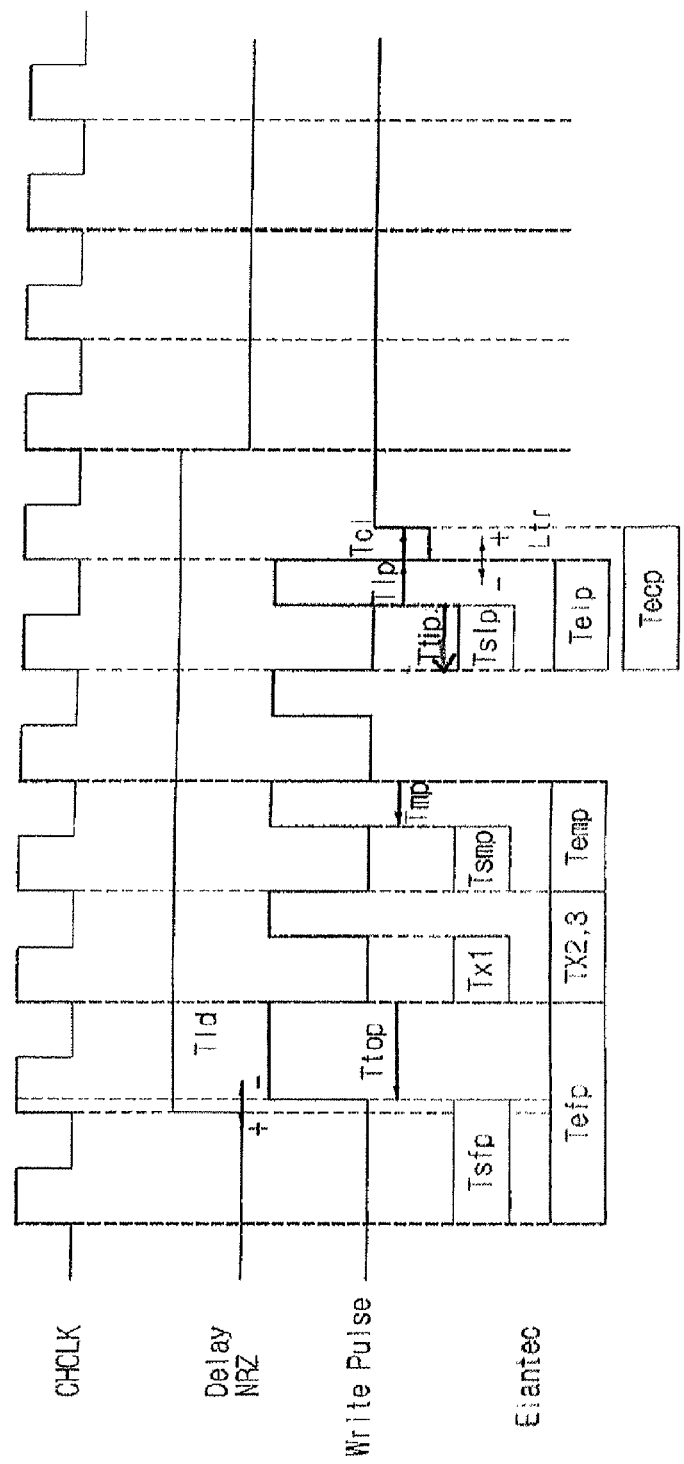
FIG. 6 is a graph illustrating the structure of the writing strategy according to an embodiment of the present general inventive concept.

Here, the CPU 34 variably controls at least one of the write pulses such as TSLP, Ttop, Tmp, Tld, Tip and Ltr of the structure of the writing strategy illustrated in FIG. 6 in order to control the optimum writing strategy using the data transmitted from the matrix jitter measuring unit 33.

Among a plurality of written data patterns, a plurality of write pulses is variably controlled such that the length errors and the jitters of the edges of the mark and the space of a specific pattern becomes a minimum value.

The searching of the writing strategy may be variably written in the unit of a frame or a sector.

The digital signal processing unit 35 converts the RF signal generated by the RF signal processing unit 31 into a digital signal and demodulates data or modulates data at the time of writing.

The RF signal of the RF signal processing unit 31 is also supplied to a servo (not shown). The servo generates a tracking error signal and a focus error signal from the RF signal and controls tracking and focus of the optical pickup 20 by referring to the tracking error signal and the focus error signal.

Figure 3:
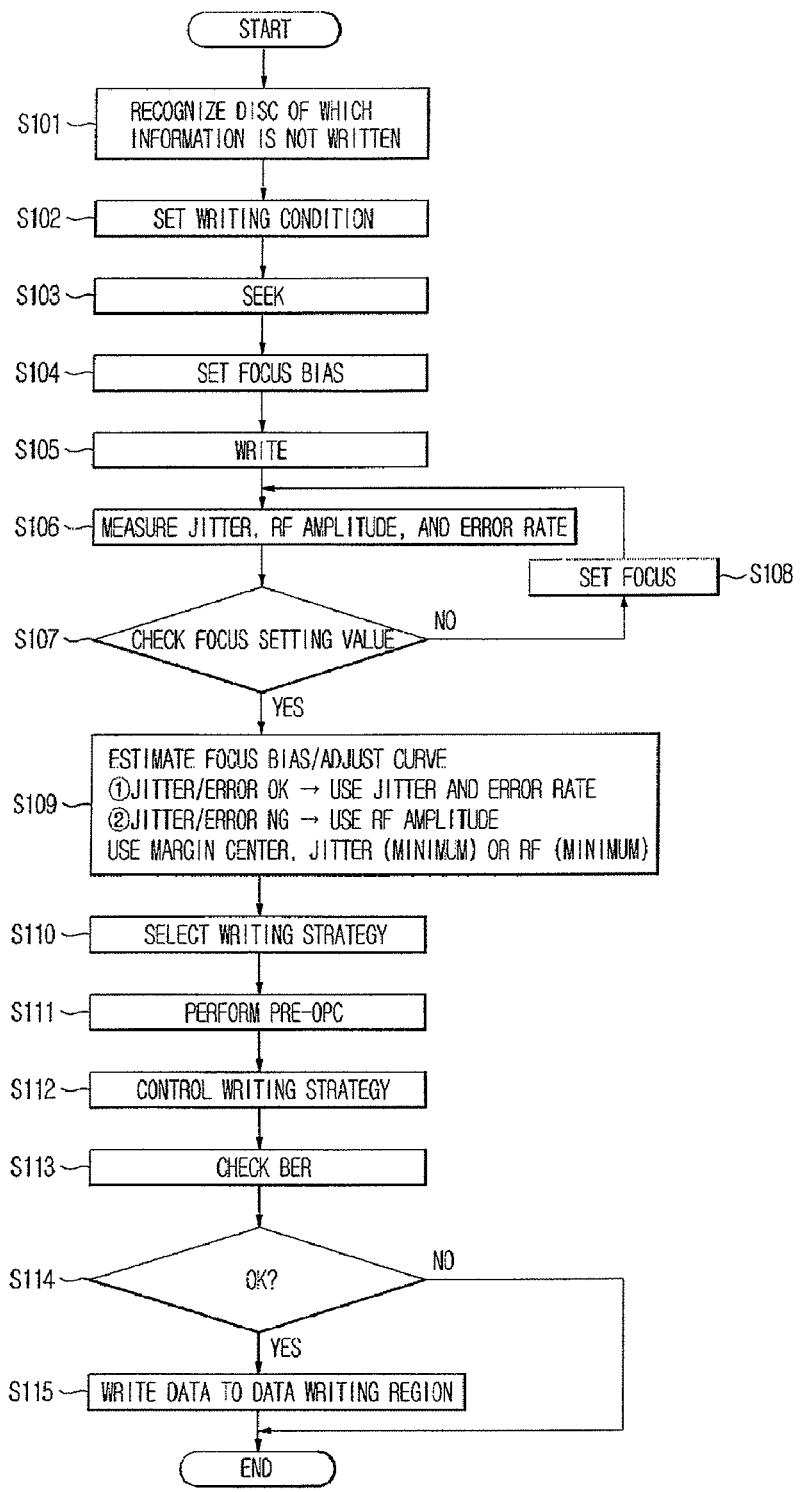
FIG. 3 is a flowchart illustrating a method of writing/reproducing information according to an embodiment of the present general inventive concept.

FIG. 3 is a flowchart illustrating a method of writing/reproducing information according to an embodiment of the present general inventive concept, which will be described together with FIGS. 4A to 9.

First, MID information, which is disc information, is recognized.

Here, the MID information is format information and track information of the optical disc which is manufactured by companies for manufacturing optical discs supported by the writing/reproducing apparatus.

At this time, if the disc information (MID information) is not identical to the disc information of a plurality of pieces of firmware which is previously stored in the CPU 34, it is determined that disc information of the disc is not present (operation S101). The position of the optical pickup, initial power of the laser and a write pulse are set such that a writing condition is set (operation S102).

Next, the optical pickup 20 is moved to a test track of the optical disk 10 to which test data will be input and a seek operation for reproduction or writing is performed (operation S103). In order to optimize the focus position of the objective lens of the optical pickup 20, a focus bias is set (operation S104). That is, a focus bias adjustment value per step to adjust the focus bias is set.

Next, the test data is written to the test region of the optical disc 10 (operation S105), and the RF signal and the jitter and the error rate according to the RF signal at the time of reproduction are measured after writing the test data (operation S106).

Next, a focus setting value according to the RF signal, the jitter and the error rate is checked (operation S107), the focus setting value is adjusted to another value (operation S108), and the RF signal and the jitter and the error rate according to the RF signal at the time of reproducing the test data are measured again.

That is, the jitter, the RF amplitude and the error rate at the time of reproduction are measured (operation S107) while the focus setting value is adjusted at the time of the reproduction of the test data (operation S108).

After checking the plurality of focus bias values (adjusted in steps), the focus bias is estimated (operation S109).

That is, if the jitter and the error rate are good as illustrated in FIG. 4A, the focus bias is adjusted using the jitter and the error rate. In contrast, if the jitter and the error rate are not good, as illustrated in FIG. 4B, the focus bias is adjusted using the RF amplitude.

At this time, the focus bias is adjusted using a central value of the laser power margin, a minimum value of the jitter or a maximum value of the RF amplitude.

Next, after the focus bias is adjusted, a writing strategy is selected (operation S110), a pre-OPC is performed (operation S111), the writing strategy is controlled (operation S112), a byte error rate (BER) is checked (operation S113), and information is written to the writing region of the optical disc 10 (operation S115) if it has been determined that the BER is checked (operation S114). If it is determined that the BER is not checked, the writing operation is completed in a state in which information is not written to the writing region of the optical disc.

Figure 9:
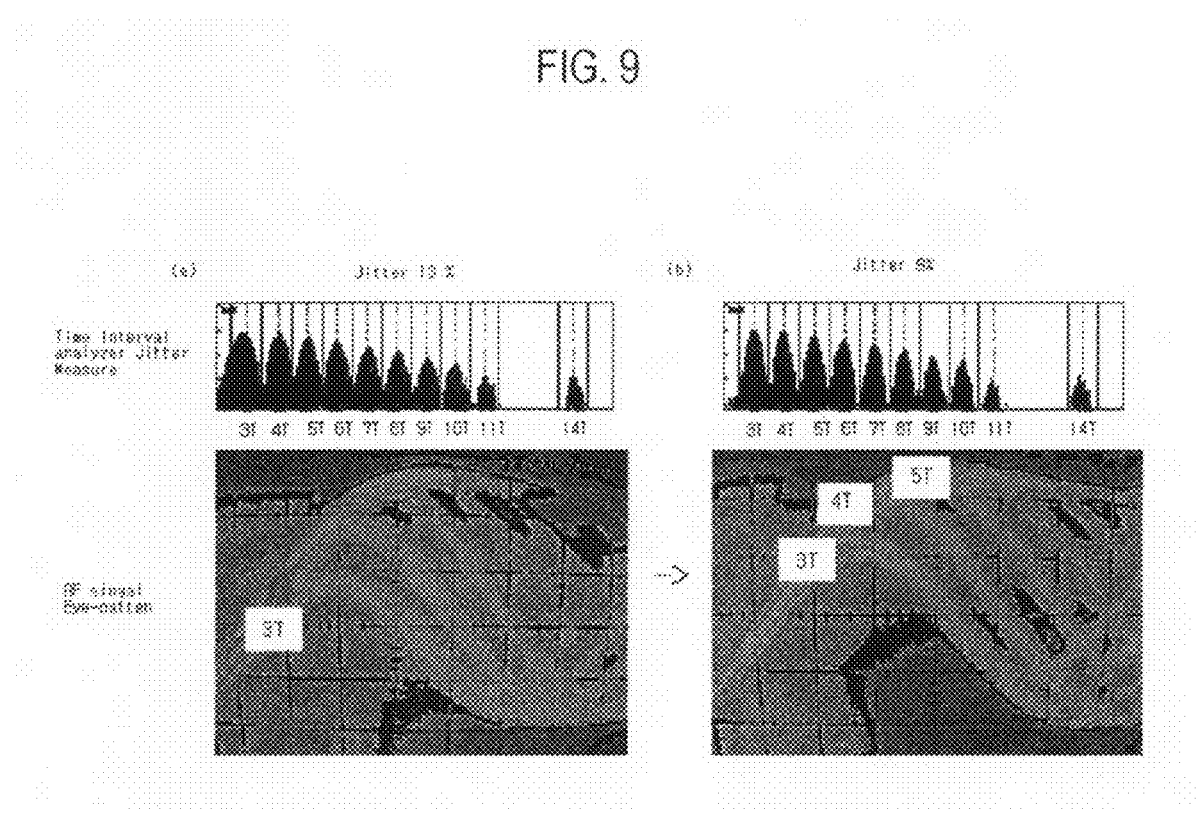
FIGS. 9A and 9B are views illustrating a comparison between the conventional method and the present general inventive concept in view of improvement of a jitter.

The focus is adjusted before the searching of the writing strategy. As illustrated in FIG. 9, the searching of the writing strategy can be stably performed as compared to the conventional method.

Figure 5:
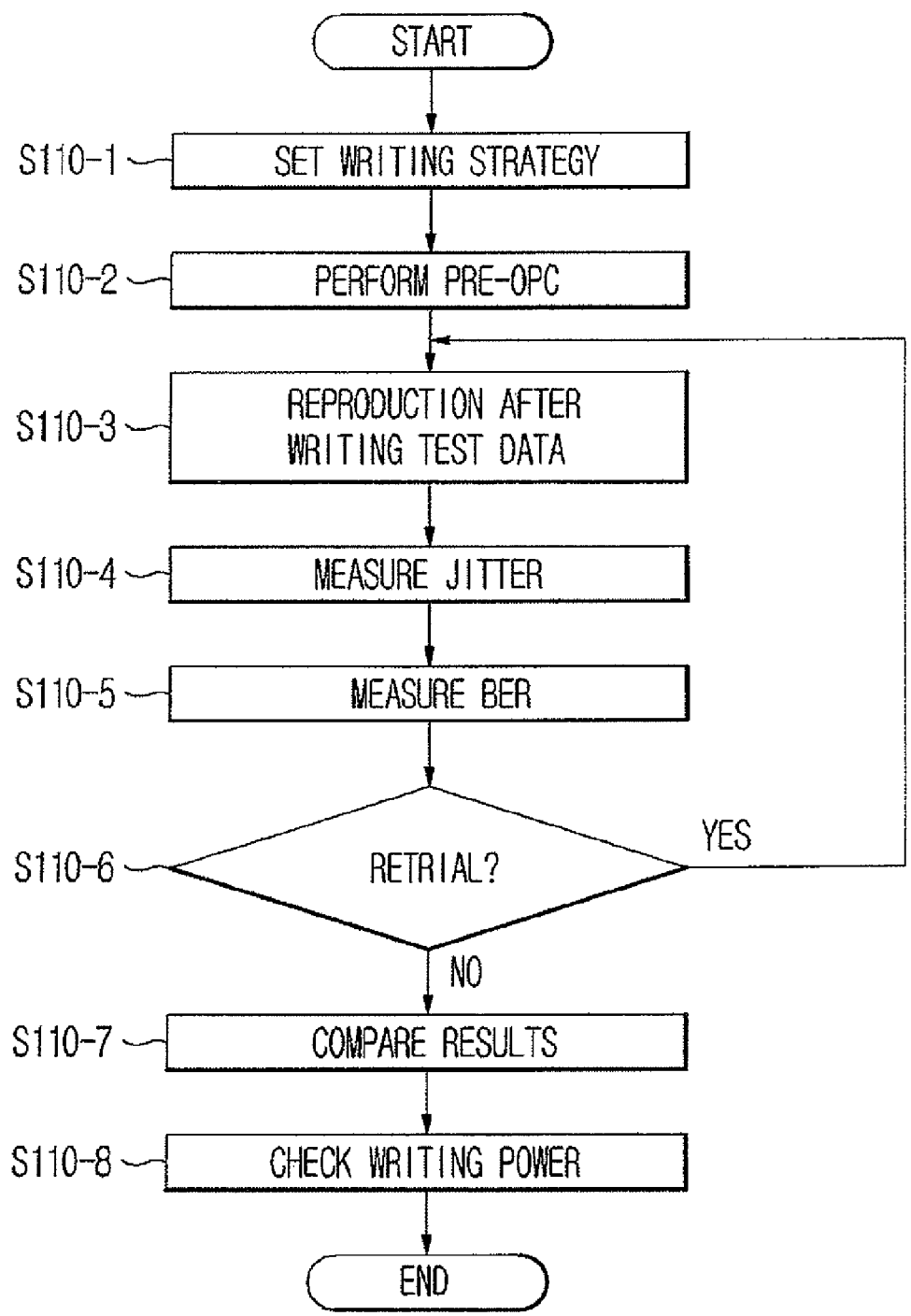
FIG. 5 is a flowchart illustrating a method of examining a writing strategy according to an embodiment of the present general inventive concept.

Now, the searching of the writing strategy (operation S110) will be described in detail with reference to FIG. 5.

First, the writing strategy is set (operation S110-1). For example, the period of a write data pattern 3T is set to 2.525T in a long pulse writing strategy, the period of 3T is set to 1.95T in a reference pulse writing strategy, and the period of 3T is set to 1.5T in a shot pulse writing strategy.

Next, the pre-OPC is performed with respect to each writing strategy (operation S110-2), the test data is written to the test region of the optical disc (operation S110-3), the jitter according to the RF signal at the time of reproducing the test data is measured (operation S110-4), and the BER according to the jitter is measured (operation S110-5).

At this time, if an error occurs when measuring the jitter and the BER, the operation for writing the test data is performed again (operation S110-6). In contrast, if the error does not occur, the jitter values of the write strategies are compared (operation S110-7) and writing power corresponding to the jitter having a minimum value is checked (operation S110-8).

For example, if the writing power is 24 mW or more and the jitter is 13% or less at the time of writing the data to the DVD-R(×2), the writing strategy is changed to another writing strategy and the writing strategy is searched for again.

If the writing strategy is not previously set, the jitter value is measured by any writing strategy and Ttop is changed by a strategy having a best jitter value, and a retrial may be performed.

The pre-OPC is performed with respect to each writing strategy, the writing operation is performed, and an optimum strategy can be selected by the power obtained from the pre-OPC and the result of measuring the jitter (that is, the average jitter of the mark and the space) obtained from the reproduction signal.

In addition, a method of controlling the writing strategy (operation S112) after the pre-OPC is performed (operation S111) will be described in detail with reference to FIGS. 7 and 8.

A space first pulse period Tsfp, space middle pulse period Tsmp, space last pulse period Tslp, a maximum pulse period Ttop, a minimum pulse period Tip, a middle pulse period Tmp, a last pulse period Tlp, a writing compensation parameter Tld that may be related to a delay non-return-to-zero (NRZ) pulse period, a length Ltr, a laser driver first pulse period Tefp, laser driver middle pulse period Temp, a laser driver last pulse period Telp, a first write-speed pulse period Tx1, a second write-speed pulse period Tx2,3, a pulse check period Tecp, and a pulse differential Tcl between the Tecp and the Telp, all of which are important factors to form the marks in the graph illustrated in FIG. 6, are adjusted by the writing strategy selected through the searching of the writing strategy so as to perform optimization.

That is, the pre-OPC is performed with respect to the factors, the factors are adjusted by the optimum power obtained at the time of the pre-OPC, and the writing operation is performed in the unit of a sector or a frame.

Figures 7, 7B, 7C:
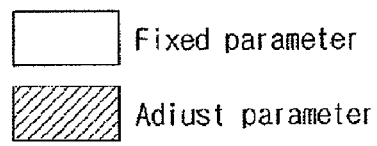
Figure 8:
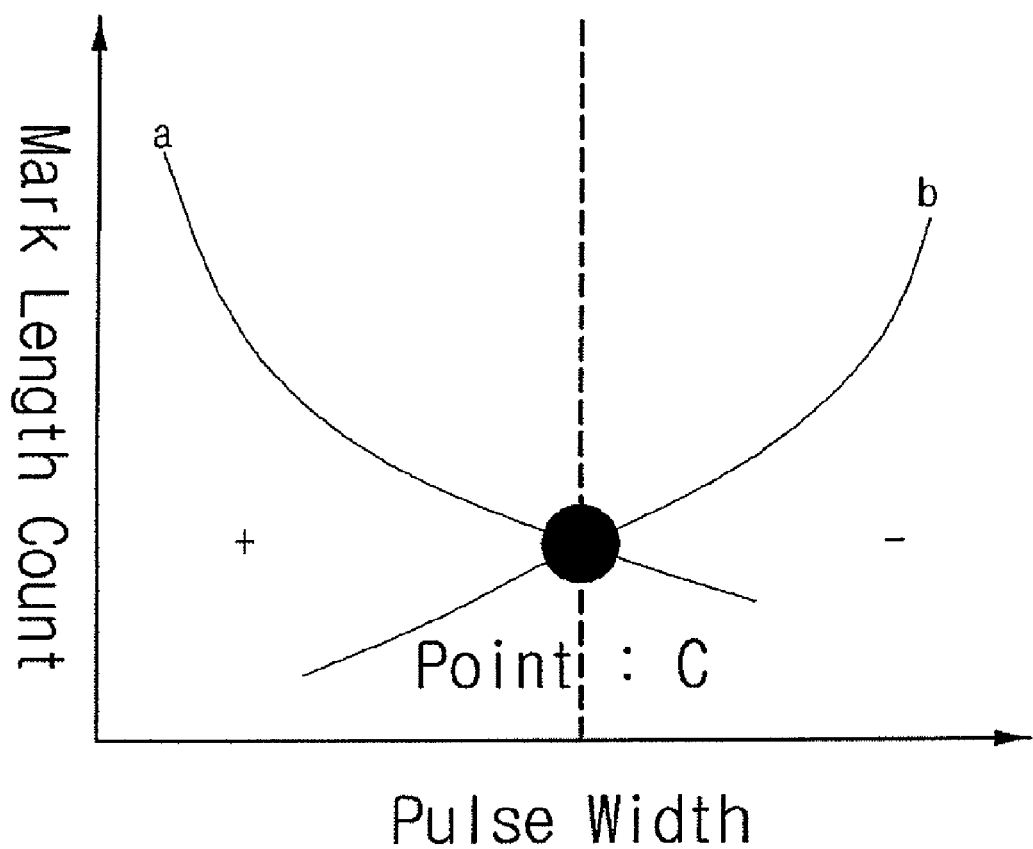
FIG. 8 is a view illustrating a method of adjusting the pulse width of a mark when controlling the method of examining the writing strategy according to the embodiment of FIG. 5.

For example, the space last pulse period TSLP is adjusted after the pre-OPC is performed, the maximum pulse period 3Ttop of 3T of the written data patterns is adjusted after the pre-OPC is performed, the maximum pulse period 4Ttop of 4T of the written data patterns is adjusted after the pre-OPC is performed, a writing compensation parameter Tld and a length Ltr parameter of a 3 m column and 3 s column are adjusted as illustrated in FIG. 7A after the pre-OPC is performed, the writing compensation parameter Tld of a portion excluding the 3 m column and 3 s column is adjusted as illustrated in FIG. 7B after the pre-OPC is performed, and the length Ltr parameter of a portion excluding the 3 m column and 3 s column is adjusted as illustrated in FIG. 7C after the pre-OPC is performed.

Here, the written data patterns are configured by the marks and the spaces of 3T to 11T and 14T, the write pulse positions and the lengths of the marks are important factors in the formation of the write mark on the disc, and the searching of the 3Ttop pulse is performed as the searching of the optimum writing pulse.

The writing pulse position and the length of the mark in the RF signal at the time of reproduction are adjusted in the writing region. For example, in FIG. 8, if (+) side data is input, a curve a is adjusted. If (−) side data is input, a curve b is adjusted. Therefore, a point c which intersects between the two curves is estimated and a pulse width is adjusted.

As described above, according to the embodiments of the present general inventive concept, since an OPC is performed after adjusting a focus at the time of searching for a writing condition, errors can be prevented from occurring due to initial focus dependency at the time of searching for a writing strategy. Accordingly, the writing strategy can be searched for in a stable state. In addition, since an optimum writing condition can be searched for in a short period of time, the write/reproduction capability of a disc can be improved and countermeasure capability of a disc can be enhanced.

It is possible to ensure a power output margin at the time of the OPC in consideration of an output limit of a laser diode.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. An apparatus to write/reproduce data to/from an optical disc, the apparatus comprising:
    a matrix jitter measuring unit which measures length errors and jitters of edges of a mark and a space of a written data pattern from a radio frequency (RF) signal generated at the time of reproduction of data from the optical disc; and
    a CPU in connection with the matrix jitter measuring unit to extract at least one of the RF signal, the jitters and an error rate of the reproduction data, adjusts a focus bias based on the extracted at least one of the RF signal, the jitters and the error rate, and performs an optimum power calibration (OPC) to search for optimum power of a laser after adjusting the focus bias.

2. The apparatus according to claim 1, wherein the OPC is variably written in the unit of a frame or a sector.

3. The apparatus according to claim 1, wherein the CPU variably adjusts at least one of a space last write pulse (Tslp), a maximum pulse period (Ttop), a last pulse period (Tld), a length (Ltr), a middle pulse period (Tmp) and a minimum pulse period (Tip) such that the length errors and the jitters of the edges of the mark and the space become minimum values.

4. The apparatus according to claim 1, further comprising:
    a phase lock loop (PLL) to control the RF signal generated at the time of reproduction of the optical disc and to transmit the RF signal to the matrix jitter measuring unit.

5. A method of setting a writing condition of an optical disc, the method comprising:
    searching for a writing strategy after adjusting a focus of the optical disc;

performing a pre-optimum power calibration (pre-OPC) and controlling the searching of the writing strategy; and checking a byte error rate (BER) and writing data to a data writing region.

6. The method according to claim 5, wherein the searching of the writing strategy comprises:

seeking a point to write test data and writing the test data, measuring a radio frequency (RF) signal, a jitter and an error rate generated when reproducing the written data, and extracting at least one of the RF signal, the jitter and the error rate and adjusting a focus bias.

7. The method according to claim 5, wherein the searching of the writing strategy comprising:

setting a plurality of write strategies, performing the pre-OPC of the writing strategies, and writing the test data, measuring the jitter according to the RF signal at the time of reproducing the data and measuring the BER, and comparing the results of the writing strategies and setting optimum writing power.

8. The method according to claim 5, wherein the searching of the writing strategy comprises variably adjusting a plurality of write pulses for forming a mark written with the searched optimum power after performing the pre-OPC such that the lengths of marks and spaces become predetermined reference lengths.

9. A method of setting a laser writing condition of an optical disc, the method comprising:

processing a reproduction signal reflected from the optical disc;

measuring a length error of a rising edge and a length error of a falling edge of a space and a mark of each written data pattern on the disc from the processed reproduction signal;

measuring a jitter of the rising edge and a jitter of the falling edge of the space and the mark of each written data pattern on the disc;

adjusting a focus bias of the laser based on the measured results; and searching for a writing strategy after adjusting the focus bias of the optical disc.

10. The method according to claim 9, wherein the adjusting the focus bias is performed where an error rate is at a minimum value, the RF signal becomes a maximum value and the jitter becomes a minimum value.

11. The method according to claim 9, wherein the adjusting the focus bias is performed by a central value of a laser power margin.

12. The method according to claim 9, further comprising:

performing a pre-optimum power calibration (pre-OPC) and controlling the searching of the writing strategy; and checking a byte error rate (BER) and writing data to a data writing region.

13. The method according to claim 9, further comprising:

optimizing a focus position of an objective lens relative to the optical disc by using the adjusted focus bias.

14. The method according to claim 9, wherein the reproduction signal is reflected from a test region of the optical disc.

* * * * *